US012722980B2

(12) United States Patent
Gordon et al.

(10) Patent No.: US 12,722,980 B2
(45) Date of Patent: Sep. 1, 2026

(54) HIGH-PURITY MAGNESIUM OXIDE AND METHOD FOR PRODUCTION THEREOF

(71) Applicant: JOINT STOCK COMPANY KAUSTIK, Volgograd (RU)

(72) Inventors: Elena Petrovna Gordon, Volgograd (RU); Alla Vitalievna Korotchenko, Volgograd (RU); Igor Nikolaevich Sizykh, Volgograd (RU); Tatiana Sergeevna Ugnovenok, Volgograd (RU)

(73) Assignee: JOINT STOCK COMPANY KAUSTIK, Volgograd (RU)

( * ) Notice: Subject to any disclaimer, the term of this patent is extended or adjusted under 35 U.S.C. 154(b) by 122 days.

(21) Appl. No.: 18/681,637

(22) PCT Filed: Jul. 6, 2022

(86) PCT No.: PCT/RU2022/050214
§ 371 (c)(1),
(2) Date: Feb. 6, 2024

(87) PCT Pub. No.: WO2023/018358
PCT Pub. Date: Feb. 16, 2023

(65) Prior Publication Data

US 2025/0136460 A1 May 1, 2025

(30) Foreign Application Priority Data

Aug. 9, 2021 (RU) ........................... RU2021123779

(51) Int. Cl.
*C01F 5/08* (2006.01)

(52) U.S. Cl.
CPC ............ *C01F 5/08* (2013.01); *C01P 2004/50* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/14* (2013.01); *C01P 2006/16* (2013.01); *C01P 2006/22* (2013.01); *C01P 2006/80* (2013.01)

(58) Field of Classification Search
CPC ......................... C01P 2006/14; C01P 2006/16
See application file for complete search history.

(56) References Cited

U.S. PATENT DOCUMENTS

2010/0183877 A1* 7/2010 Ishibashi .................. C01F 5/08 428/402

FOREIGN PATENT DOCUMENTS

JP 2007091525 A 4/2007
RU 2690808 C1 * 6/2019 ................ C01F 5/14
WO 2009001883 A1 12/2008

OTHER PUBLICATIONS

Machine translation RU2690808 (Year: 2025).*
International Search Report and Written Opinion for International Application No. PCT/RU2022/050214, mailed Nov. 3, 2022, 11 pages.

* cited by examiner

*Primary Examiner* — Alexandre F Ferre
(74) *Attorney, Agent, or Firm* — Barnes & Thornburg LLP; Ryan L. Marshall

(57) ABSTRACT

The invention relates to chemical technology for producing high-purity magnesium oxide used in the pharmaceutical, cosmetic, and food industries, in the production of ceramics, glasses, optical materials, electronic materials, catalysts, polymer materials, transformer steel.

13 Claims, No Drawings

HIGH-PURITY MAGNESIUM OXIDE AND METHOD FOR PRODUCTION THEREOF

This application is a National Stage application of International Application No. PCT/RU2022/050214, filed Jul. 6, 2022, the entire contents of which is hereby incorporated herein by reference. This application also claims the benefit under 35 U.S.C. § 119 of Russian Patent Application No. 2021123779, filed Aug. 9, 2021, the entire contents of which is hereby incorporated herein by reference.

The invention relates to chemical technology, specifically to high-purity magnesium oxide and method for production thereof.

Magnesium oxide is a non-toxic fire- and explosion-proof substance that is commonly used in chemical, electrotechnical, electronic, pulp and paper, agricultural, pharmaceutical, and food industries, as well as in production of periclase, rubber, transformer steel, construction, flame-retardant, fire-resistant materials, etc.

Magnesium oxide production is based on thermal decomposition of natural or synthetic magnesium compounds: magnesium carbonate, basic magnesium carbonate, magnesium hydroxide, magnesium chloride, etc. [Mark A. Shand. The Chemistry and technology of magnesium oxide. Wiley-Interscience, 2006; Kirk-Othmer. Encyclopedia of chemical technology. Fourth edition. Vol. 15, p. 353, 354].

When magnesium oxide is obtained from natural raw materials, it contains a significant amount of impurities that are present in natural raw materials.

However, there are several applications such as pharmaceutics, pharmacopeia, cosmetics, food industry, production of special ceramics, special glass, optical materials, electronic materials, catalysts, and other materials for which chemical purity of magnesium oxide is essential.

The presence of even fractional amount of impurities such as iron, manganese, chromium, nickel, copper, cobalt, and cadmium in magnesium oxide can impart an undesirable colour to the products in which it will be used (glass, polymer products, etc.).

Heavy metal impurities in magnesium oxide are not acceptable when used in pharmaceuticals, pharmacopoeia, cosmetics, and the food industry.

Impurities of certain ions, such as chlorides, fluorides, sulphates, sodium, potassium, lithium, and calcium, are undesirable when using magnesium oxide in the production of catalysts, transformer steels, electronics industry, nuclear industry, etc.

Synthetic magnesium oxide contains significantly less impurities than magnesium oxide obtained by calcining of natural raw materials.

Important features of magnesium oxide are the reactivity (activity) and physicochemical properties of magnesium oxide, which can be characterized by such indicators as specific surface area, pore volume and pore size distribution, modal pore diameter, particle size distribution, viscosity of the aqueous suspension and its stability in time. The indicated features of magnesium oxide determine its technological properties: flowability, dispersibility (including in water and organic solvents), uniformity of its distribution in the polymer matrix, uniformity of its distribution in other mixtures and forms when used as an additive.

Magnesium oxide activity can be characterised by such features as specific surface area, iodine activity, citric acid activity, acetic acid activity, typical reactivity. Depending on its application, magnesium oxide is used according to its required activity.

Magnesium oxide with a specific surface area of 5-70 $m^2/g$ is commonly used for the applications mentioned (selected) above.

The reactivity (activity) and physicochemical properties of magnesium oxide depend on the shape, size, and uniformity of the primary particles of magnesium oxide and the shape, size, and uniformity of agglomerates (secondary particles formed by primary particles of magnesium oxide), as well as on the ratio between them. Primary particles and agglomerates are formed at the stages of synthesis and hydrothermal crystallization of the magnesium oxide precursor (magnesium hydroxide, basic magnesium carbonate, magnesium trihydrocarbonate, etc.) and magnesium oxide retains the shape of its predecessor up to a certain temperature of calcination.

Primary particles of magnesium oxide can be obtained in the form of particles of indefinite shape, in the form of polygonal plates [JPS6136119, publ. 20 Feb. 1986], thin scales, cubes [JP2007091525, publ. 12 Apr. 2007] and can form agglomerates of various shapes: indefinite shape [WO0183848, publ. 8 Nov. 2001], spherical [JPS6136119, publ. 20 Feb. 1986; JP3821633, publ. 24 Apr. 2001], rod-like [WO2014126075, publ. 21 Aug. 2014; CN107188207, publ. Sep. 22, 2017], etc.

Depending on the shape and size of the primary particles and the shape and size of the agglomerates, as well as the ratio between them, magnesium oxide will have a different pore volume, pore size distribution and, accordingly, a modal pore diameter, a different proportion of macropores, mesopores, and micropores in the total pore volume.

In accordance with the international classification IUPAC, pores are divided into the following groups by their size: micropores (<2 nm), mesopores (2-50 nm); macropores (>50 nm).

That is, macropore volume characterises void (pore) volume between agglomerates of particles (secondary particles consisting of primary particles). Mesopore volume characterises the volume of inter-particle voids (pores) between primary particles that form an agglomerate and contact each other. Micropore volume characterises void (pore) volume in primary particles.

Primary particles aggregation can occur due to different reasons and can be caused, for example, by the presence of surface charge in the particles dispersed in liquid; by the sedimentation of ingredients dissolved during drying; by the presence of electrostatic charge in a dry state; by physical stress during grinding or by boundary grain during calcination. Thus, the powder often has a characteristic orderly particle structure, depending on the types or conditions of the production processes and the quality of the raw materials [WO0183848, publ. 8 Nov. 2001].

Most magnesium oxide manufacturers focus their efforts on addressing issues related to purity, activity, and producing magnesium oxide in a variety of primary particle and agglomerate shapes and sizes that are optimal for a particular application.

More thoroughly purified raw materials and calcination at higher temperatures improve the purity of the resulting magnesium oxide.

High-purity magnesium oxide powder is described [JP201211078, publ. 1 Nov. 2012], having a purity of at least 99.9 wt. % and a Pb content of less than 0.1 ppm, in which the half-width of the peak of each of the (111) plane, the (200) plane, and the (220) plane is determined by powder X-ray diffraction using Cu—Kα radiation is not more than 0.20 degrees and the average particle diameter (d50) measured by laser diffraction is from 0.1 to 10 μm.

According to the description, to purify a magnesium chloride solution from impurities, an aqueous alkali solution in an amount of 20 mol % of magnesium ions was added to the aqueous solution obtained by mixing anhydrous magnesium chloride and ultrapure water to obtain a suspension of magnesium hydroxide, and then the suspension of magnesium hydroxide was kept at temperature of about 80-100° C. for 10-100 hours with intensive stirring at a speed of 15000-30000 rpm. A purified solution of magnesium chloride, obtained after removing the precipitate of magnesium hydroxide that had adsorbed impurities, was used to synthesize magnesium hydroxide by reacting with a purified solution of sodium hydroxide. The resulting suspension of magnesium hydroxide was subjected to hydrothermal treatment at a temperature of 100-150° C. and a time of 0-60 min. According to the authors, when processing is carried out in an autoclave, crystalline grains of magnesium hydroxide are formed and the impurities contained in the crystals are leached into solution, while the amount of impurities in the magnesium hydroxide is reduced. The obtained magnesium hydroxide powder was calcined at a temperature of 1000-1500° C.

The authors do not provide the mass fractions of impurities that impart colour-iron, manganese, nickel, chromium, the mass fraction of chlorides, as well as the specific surface area and pore volume. The freshly deposited precipitate of magnesium hydroxide in a bischofite solution is gel-like and pseudoamorphous, which leads to difficulties in its isolation: settling and filtering, so the authors carry out long-term exposure at elevated temperatures –10-100 hours at 80-100° C., which is not economically profitable.

Inventions [JP3980569, publ. 26 Sep. 2007; JP3939102, publ. 4 Jul. 2007; JP3563269, publ. 8 Sep. 2004] describe the preparation of magnesium oxide with a low content of lead Pb by calcination of dried magnesium hydroxide obtained by reacting sea water and calcium hydroxide containing lead or lead compounds in the presence of a halogen source, which is a halide or halogen gas at a temperature of 700-1300° C. The obtained magnesium oxide with a lead content of less than $2\times10^{-7}$ mol per 1 mol of magnesium oxide is intended for use as an additive for fertilizers, food, raw material for medicines, cosmetics, etc. At the same time, the authors do not provide either the mass fractions of other impurities, or the specific surface area or activity, or the parameters of the primary and secondary particles.

Magnesium oxide for food additives is described [patent JP2003033159, publ. 4 Feb. 2003], which has a mass fraction of lead of not more than 10 ppm, the content of particles with a diameter of more than 8 microns of not more than 5 vol % (by laser diffraction), the specific surface area determined by the BET method in the range from 1 to 50 $m^2/g$, citric acid activity of from 80 to 450 s. The examples show the chemical purity of the resulting magnesium oxide, determined by emission plasma spectrometry (ICP)—the mass fractions of impurities were: lead from 0.3 to 1.4 ppm, chromium—not more than 2 ppm, cadmium from 0.2 to 2.4 ppm, copper from 0.1 to 0.2 ppm. In the obtained magnesium oxide, the mass fractions of impurities that impart colour-iron, manganese, nickel, the mass fraction of chlorides are not provided, and the parameters of primary and secondary particles are not provided.

The presence of agglomerates with a controlled particle size allows improving some properties of magnesium oxide powder such as, for example, processability, flowability, dispersibility (including one in water and organic solvents), which is mentioned by the inventions specified below.

Magnesium oxide powder is described [JP2007091525, publ. 12 Apr. 2007] containing primary and secondary particles in which a large number of primary particles is aggregated; the diameter of these particles is from 0.5 to 10 μm and specific surface area determined by a BET method is from 0.1 to 3 $m^2/g$. The content of impurities in magnesium oxide was: mass fractions of chlorides, calcium, aluminium, silicon, iron, sodium, and potassium do not exceed 20 ppm each. The authors note that the shape of not less than 90% of magnesium oxide particles is hexagonal (cubical). The mentioned magnesium oxide is prepared by the calcination of magnesium oxalate at 1200-1400° C. with an average particle diameter 50-200 μm obtained by the interaction of aqueous solutions of ammonium oxalate and magnesium chloride. The mentioned magnesium oxide powder is intended to be used as a raw material to form protective film of a dielectric layer on a colour plasma display panel. It is necessary to note that a specific surface area value (from 0.1 to 3 $m^2/g$) of magnesium oxide indicates its low reactivity and, therefore, limited applicability in food industry, medical products, catalysts, polymer compounds, as an annealing separator in transformer steel production etc.

The closest invention assumed as a prototype is the invention [WO2009001883, publ. 31 Dec. 2008] in which an aggregate of magnesium oxide particles consisting of magnesium oxide particles with an average size of not less than 1 μm is described. An aggregate of magnesium oxide particles has a particle diameter of not less than 10 μm, approximately spherical shape and contains Si, Al, Ca, Fe, V, Cr, Mn, Ni, Zr, B, and Zn impurities not exceeding 10 ppm each, and the total amount of impurities does not exceed 100 ppm. The magnesium oxide particle aggregate has a first mode size and a second mode size larger than the first mode size in the pore distribution measured by mercury porosimetry, with the first mode having a size of from 0.1 to 1 μm and a second mode size of from 8 to 20 μm.

The method for producing an agglomerate of magnesium oxide particles consists of the following stages: purification of the initial solution of magnesium chloride and an aqueous alkali solution with freshly deposited magnesium hydroxide, filtration, synthesis, hydrothermal treatment at a temperature of 100-150° C., filtration, washing, drying, calcining of magnesium hydroxide powder, dispersion magnesium oxide particles in a solvent, and spray drying to produce aggregates of magnesium oxide particles.

The authors mention that sphere-shaped aggregates increase the dispersibility and flowability of magnesium oxide. However, spherical and high-purity aggregates are quite large (not less than 10 μm) and their activity is low (calcination temperature 1400° C.), which limits the applications of this aggregate of magnesium oxide particles in catalyst, polymer compound, transformer steel, etc. production. Moreover, additional stages of dispersing magnesium oxide in an organic solvent and subsequent spray drying lead to increased consumption of raw materials, more complex hardware design and, consequently, increased production costs.

Therefore, the problem of high purity magnesium oxide production with a low concentration of impurities and sufficient activity (specific surface area within the range 5-70 $m^2/g$) and primary and secondary particle parameters providing good technological properties in selected areas of application currently remains unresolved.

The object of the present invention is to obtain high-purity magnesium oxide, which has a specific surface area, determined by the BET method, from 5 to 70 $m^2/g$, an average particle size (d50), determined by laser diffraction, of not more than 5 μm, a mass fraction of impurity elements of each of Pb, Cd, As, Hg of not more than 0.1 ppm, a mass fraction of impurity elements of each of Ba, Zn, Ti, Mn, Co, Mo, V, Sb, Sr of not more than 1 ppm, a mass fraction of impurity elements of each of Al, F of not more than 5 ppm, a mass fraction of impurity elements of each of P, Cr, Ni, K, Li of not more than 10 ppm, a mass fraction of Fe of not more than 50 ppm, a mass fraction of Si of not more than 0.01%, a mass fraction of impurity elements of each of Ca, B of not more than 0.02%, a mass fraction of sulphates $SO_4^{2-}$ of not more than 0.02%, a mass fraction of impurity elements of each of Na, $Cl^-$ of not more than 0.05%, has a pore volume in the range of $0.9\times10^{-6}$ to $1.5\times10^{-6}$ $m^3/g$, includes primary particles and agglomerates consisting of primary particles.

The technical result is achieved by the fact that high-purity magnesium oxide is obtained by calcination of the precursor-magnesium hydroxide, obtained by continuous interaction of a concentrated aqueous solution of magnesium chloride with an aqueous solution of sodium hydroxide at a molar ratio of $OH^-:Mg^{++}$ ions in the range (1.9÷2.1):1 with the continuous supply of a suspension of magnesium hydroxide seed crystals into the reaction mass, and the magnesium hydroxide seed crystals are pre-treated with a concentrated aqueous solution of magnesium chloride, after the interaction of the reagents, the magnesium hydroxide suspension is sent for aging, while the temperature is maintained at least 40° C., then hydrothermal crystallization of the magnesium hydroxide particles is carried out in the presence of dihydric alcohol, at a temperature ranging from 120 to 220° C., pressure ranging from 0.1 to 2.3 MPa, and duration ranging from 1 to 10 hours.

An aqueous solution of sodium hydroxide obtained by an electrochemical method (mercury, diaphragm or membrane electrolysis) is used as a concentrated aqueous solution of sodium hydroxide. The use of the specified aqueous solution of sodium hydroxide allows one to obtain magnesium hydroxide of higher purity compared to methods using lime milk, ammonia water or sodium hydroxide obtained by chemical methods as an alkaline agent.

An aqueous solution of synthetic or natural magnesium chloride is used as a concentrated aqueous solution of magnesium chloride. The former is preliminarily purified by known methods from undesirable impurities of heavy metals and/or iron, and/or sulphates, and/or boron, and/or bromine, and/or other unwanted impurities or mixtures thereof, provided that the final stage of purification is ion exchange purification.

Mechanical and reagent treatment of an aqueous solution of magnesium chloride does not provide a high degree of purification from undesirable impurities. Purification of an aqueous solution of magnesium chloride with freshly precipitated magnesium hydroxide (by adding sodium hydroxide to it in an amount of 5-10% of the stoichiometric amount) makes it possible to remove significant amounts of impurities, but is coarse and can only be an intermediate stage of purification. In addition, in some cases, reagent treatment can introduce additional undesirable impurities into the magnesium chloride solution. For example, when purifying an aqueous solution of magnesium chloride from sulphates ($SO_4^{2-}$), a solution of barium chloride is used. After separation of the barium sulphate precipitate, trace amounts of barium remain in the aqueous solution of magnesium chloride, which in soluble forms is toxic and its presence is undesirable when using magnesium oxide in the food, pharmaceutical, and cosmetic industries.

To solve this problem, the present invention uses purification of an aqueous solution of magnesium chloride from heavy metals using ion exchange resins selective for heavy metals as a final purification. Examples of ion exchange resins are ion exchange resins with iminodiacetic acid chelate groups, for example LEWATIT TP 208 manufactured by Lanxess (Germany), Amberlite IRC 748 manufactured by ROHM and HAAS (USA) or others.

It is preferred to use aqueous solution of magnesium chloride with a concentration of not less than 350 $g/dm^3$.

Low concentrations of magnesium chloride (low supersaturation) are known to promote the growth of magnesium hydroxide crystal nuclei, thereby creating relatively larger magnesium hydroxide crystals. High concentrations (high supersaturation), accordingly, lead to rapid and extensive nucleation and small particle sizes of magnesium hydroxide. [Huaxiong Fang, Tao Zhou, Xiangping Chen et al./Controlled preparation and characterization of nano-sized hexagonal $Mg(OH)_2$ flame retardant. Particulogy, Volume14, 2014, pages 51-56.]

Thus, to obtain larger particles that ensure good processability and filterability of the suspension, it is necessary to use dilute solutions of magnesium chloride. However, in industrial processes, it is more technologically advanced to use a concentrated aqueous solution containing at least 350 $g/dm^3$ of magnesium chloride, since this allows reducing the volume of reactor and tank equipment and thereby increase the technical and economic indicators of the process. Therefore, the inventors conducted extensive research to overcome this contradiction.

The molar ratio of sodium hydroxide and magnesium chloride ions $OH^-:Mg^{++}$ within the range (1.9÷2.1): 1 is preferable. An increase in excess magnesium chloride leads to contamination of the resulting magnesium hydroxide with magnesium chloride, the need to increase the volume of water for washing it, as well as an increase in the mass fraction of chlorides in the resulting magnesium oxide. An increase in the excess of the alkaline agent leads to the formation of a fine, gel-like, difficult-to-filter precipitate of magnesium hydroxide, and, consequently, to a decrease in process productivity.

A suspension of magnesium hydroxide seed crystals in an amount of 5-200% of the total mass of the supplied initial reagents is continuously fed into the zone of continuous interaction of a concentrated aqueous solution of magnesium chloride with an aqueous solution of sodium hydroxide. Reducing the amount of seed crystal suspension to less than 5% does not allow obtaining a sufficient amount of agglomerates of magnesium hydroxide particles. Increasing the amount of seed crystal suspension above 200% reduces the economic efficiency of the process and does not provide a noticeable improvement in the shape and size of the primary particles and agglomerates.

A pre-obtained suspension of magnesium hydroxide crystals is used as a suspension of seed crystals. Before being supplied to the synthesis zone, seed crystals of magnesium hydroxide are pre-treated with a concentrated aqueous solution of magnesium chloride, which leads to the formation of a layer of magnesium chloride on the surface of the seed crystals. When seed crystals with a layer of magnesium chloride enter the synthesis zone, with subsequent dosing of an aqueous solution of sodium hydroxide, new (freshly deposited) magnesium hydroxide particles are uniformly formed on the surface of the seed crystals of magnesium hydroxide, that is, agglomerates are formed, the core of which is the seed crystals. The presence of seed crystals in the synthesis zone also contributes to the formation of newly formed magnesium hydroxide particles of a given type.

Magnesium hydroxide suspension is directed from the synthesis zone to the ageing zone. It is known [Wasserman I. M. Khimicheskoye osazhdeniye iz rastvorov. (Chemical precipitation from solutions.) L.: Chemistry, 1974, 208 p.], that under conditions of a continuous precipitation process, the growth of precipitate particles has its own characteristic features. In a steady-state continuous precipitation process, all properties of the precipitate-solution system are continuously reproduced, including the quantitative characteristics of the formation, growth and properties of new precipitated particles. The precipitate in the reactor has fairly stable properties (structural, granulometric, etc.) and acts as a seed for newly formed particles. Therefore, precipitate seeding is a parameter of the precipitation process that has a strong influence on the properties of the resulting precipitate.

It was experimentally determined that in order to obtain a magnesium hydroxide precipitate in crystalline form, it is necessary to maintain the temperature of not less than 40° C., more preferably in the range from 50 to 90° C. in the dosing zone of the initial reagents and in the aging zone of the magnesium hydroxide precipitate. This allows avoiding even local foci of formation of magnesium hydroxide precipitate in pseudoamorphous form, the suspension of which is a gel-like viscous mass that is difficult to mix, and obtaining a mobile suspension of magnesium hydroxide with low viscosity (especially important for continuous processes), which increases the manufacturability and economic efficiency of the process.

The experimentally determined effective stirring speed, which ensures a sufficient phase contact area and the formation of a certain structure of magnesium hydroxide crystals, is in the range from 20 to 300 rpm.

After aging, magnesium hydroxide crystals are directed to hydrothermal crystallization to produce magnesium hydroxide crystals, which are precursors to magnesium oxide crystals.

Hydrothermal crystallization is carried out in the presence of dihydric alcohol at a temperature ranging from 120 to 220° C., pressure ranging from 0.1 to 2.3 MPa, and duration ranging from 1 to 10 hours. In this process of hydrothermal crystallization of magnesium hydroxide, the formation of a certain structure and size of primary particles and agglomerates consisting of primary particles, and leaching of impurities into the mother liquor, which leads to more effective washing of magnesium hydroxide crystals from impurities and allows subsequent obtaining magnesium oxide with high purity, specified specific surface area and properties of primary particles and agglomerates after calcination.

It was experimentally discovered that the addition of a dihydric alcohol, for example ethylene glycol or propylene glycol, in an amount of 0.01-1.0% by weight of magnesium hydroxide at the stage of hydrothermal crystallization, is sufficient to eliminate uncontrolled agglomeration of magnesium hydroxide particles and secondary enlargement due to the sticking of agglomerates into blocks. It is likely that dihydric alcohols prevent the agglomeration of magnesium hydroxide particles due to $OH^-$ groups, which are oriented around the magnesium hydroxide particles and create a solvation shell.

Hydrothermal crystallization of magnesium hydroxide crystals in the presence of dihydric alcohol affects the volume of macropores, mesopores, and micropores in the final product and their ratio. With increasing temperature and increasing duration of hydrothermal crystallization in the presence of dihydric alcohol, the content of micropores decreases, and the content of macropores and mesopores increases.

Thus, the authors discovered that the combination of the technological methods used, namely the addition of seed crystals and their pre-treatment with concentrated bischofite purified from impurities, as well as hydrothermal crystallization in the presence of diatomic alcohol, makes it possible to obtain high-purity magnesium hydroxide, which ensures the production of high-purity magnesium oxide, including primary particles and agglomerates consisting of primary particles with controlled activity, structure of primary and secondary particles, pore volume, and particle size distribution.

Hydrothermal crystallization is carried out in the reaction mother liquor; the preferred content of magnesium hydroxide is in the range from 2 to 15 wt. %.

Separation of magnesium hydroxide crystals from the mother liquor is carried out by any known method, for example, by filtering the resulting suspension or settling, followed by filtering the thickened part.

Washing of magnesium hydroxide crystals from chlorides is carried out by any known method, for example, by washing the precipitate with deionized water on a filter and/or by repulping the precipitate with a subsequent filtration. To increase the efficiency of washing, an aqueous solution of sodium hydroxide with a mass fraction of 0.01-0.10% is used as a washing liquid.

To obtain magnesium oxide, washed and filtered magnesium hydroxide crystals with a moisture content of 20-50 wt. % calcined in a furnace at temperatures ranging from 700 to 1100° C. Calcination of magnesium hydroxide crystals is carried out in a periodic or continuous manner. During the calcination of magnesium hydroxide crystals, which is a precursor to magnesium oxide crystals, the required structure of high-purity magnesium oxide particles is finally formed.

After cooling, the magnesium oxide is ground in a known manner, for example in a rotary, hammer or jet mill, and surface-treated if necessary.

The obtained high-purity magnesium oxide has a specific surface area, determined by the BET method, in the range from 5 to 70 $m^2/g$, an average particle size (d50), determined by laser diffraction, of not more than 5 μm, a mass fraction of impurity elements of each of Pb, Cd, As, Hg of not more than 0.1 ppm, a mass fraction of impurity elements of each of Ba, Zn, Ti, Mn, Co, Mo, V, Sb, Sr of not more than 1 ppm, a mass fraction of impurity elements of each of Al, F of not more than 5 ppm, a mass fraction of impurity elements of each of P, Cr, Ni, K, Li of not more than 10 ppm, a mass fraction of Fe of not more than 50 ppm, a mass fraction of Si of not more than 0.01%, a mass fraction of impurity elements of each of Ca, B of not more than 0.02%, a mass fraction of sulphates $SO_4^{2-}$ of not more than 0.02%, a mass fraction of impurity elements of each of Na, $Cl^-$ of not more than 0.05%, has a pore volume determined by mercury porosimetry in the range of $0.9\times10^{-6}$ to $1.5\times10^{-6}$ $m^3/g$, includes primary particles and agglomerates consisting of primary particles.

High-purity magnesium oxide obtained by the described method consists of primary particles and agglomerates (secondary particles formed by primary particles of magnesium oxide).

The presence of agglomerates in magnesium oxide powder improves its flowability, dispersibility, and processability (manufacturability), and also contributes to the most uniform distribution of magnesium oxide when used as a main component or an additive in various mixtures and forms. When using the described magnesium oxide in polymer matrices, a higher degree of filling can be achieved while maintaining high performance of polymer materials.

In addition, the presence of primary particles and agglomerates in the magnesium oxide powder contributes to a more extended time for the entry of magnesium oxide into chemical reactions, for example, in the neutralization and hydration reactions, since non-agglomerated primary particles will be the first to react, and then the magnesium oxide agglomerates will begin to enter into reaction. The gradual entry of the reaction is a useful quality when using magnesium oxide in pharmaceuticals and cosmetics, as well as when using magnesium oxide as an annealing separator in the production of transformer steels.

Controlled sizes of primary particles, agglomerates and their ratios allow obtaining controlled pore volume distributions, total pore volume, and modal pore diameter. Agglomerated structures are characterized by the presence of macropores, while pores formed by primary particles, located separately or as part of agglomerates, belong to mesopores and micropores. Thus, the ratio between macropores, mesopores, and micropores indicates the ratio between agglomerates and primary particles and is therefore an important characteristic for powder materials containing agglomerates.

High-purity magnesium oxide obtained by the described method has a total pore volume in the range from $0.9\times10^{-6}$ to $1.5\times10^{-6}$ $m^3/g$, determined by mercury porosimetry. In this case, high-purity magnesium oxide has the following ratio of pore volumes:macropore volume is in the range of 85-93 vol %, mesopore volume is in the range of 6.5-14 vol %, micropore volume is in the range of 0.5-1.5 vol %. In this case, the modal pore diameter determined by mercury porosimetry is in the range of 150-400 nm.

High-purity magnesium oxide obtained by the described method has a viscosity of the aqueous suspension of no more than 400 cP, preferably no more than 200 cP, which makes it possible to obtain aqueous suspensions that are technologically convenient for mixing, pumping, and dosing in various technological processes.

High-purity magnesium oxide obtained by the described method ensures the production of suspensions that are stable over time, have sedimentation stability and have a suspension sedimentation rate of not more than 10 vol % per hour.

High-purity magnesium oxide obtained by the described method has a controlled particle size, the average particle size (d50), determined by laser diffraction, is not more than 5 microns, the diameter of 10% of the particles is not more than 2 microns, the diameter of 90% of the particles is not more than 30 microns. In this case, the residue on the 325 mesh sieve, determined by the wet sifting method, is not more than 0.1%, preferably not more than 0.05%.

High-purity magnesium oxide obtained by the described method has a citric acid activity in the range from 40 to 200 s. These activity values of magnesium oxide ensure its effectiveness when used in selected applications.

High-purity magnesium oxide obtained by the described method has, at a relatively low calcining temperature of 700-1100° C., high chemical purity, adjustable specific surface area, total pore volume, ratio between macro-meso-micropores, modal pore diameter, particle size distribution and activity, which allows it to be used in the pharmaceutical, pharmacopoeial, cosmetic, and food industries, in the production of special ceramics, special glasses, optical materials, electronic materials, catalysts, polymer materials, transformer steel, and other areas for which the chemical purity of magnesium oxide is important.

High-purity magnesium oxide obtained by the described method can be surface-treated with one or more surface-treating agents and/or silane coupling agents and/or special additives and/or mixtures thereof.

As surface-treating agents, compounds selected from the group of saturated and unsaturated fatty acids containing from 8 to 20 carbon atoms, or their salts of alkali metals and/or alkaline earth metals, and/or mixtures thereof, are used. Examples of such compounds are stearic acid, oleic acid, lauric acid, palmitic acid, behenic acid, myristic acid, tall oil fatty acids, etc.

Compounds selected from the group of organofunctional trialkoxysilanes, tetraalkoxysilanes, including alkyltriethoxysilanes, alkyltrimethoxysilanes, alkenyltriethoxysilanes, alkenyltrimethoxysilanes, aminosilanes, etc., and/or mixtures thereof, are used as silane coupling agents. Examples of such compounds are methyltriethoxylane, octyltriethoxysilane, vinyltrimethoxysilane, vinyltriethoxysilane, trimethoxysilane, vinyl-tris-(2-methoxyethoxy)silane, 3-methacryloxypropyl-2-(3,4-epoxycyclohexy)-ethyltrimethoxysilane, glycidoxypropyltrimethoxysilane, aminopropyltriethoxysilane, aminopropyltrimethoxysilane, tetraethoxysilane, etc.

Organic and inorganic compounds of silicon, boron, calcium, phosphorus, antimony, titanium or mixtures thereof are used as modifying special additives.

Silicon compounds include inorganic salts of silicic acids and alkali and alkaline earth metals, silicon dioxide or mixtures thereof.

Boron compounds include boron oxides, boric acid and its alkali and alkaline earth metal salts or mixtures thereof.

Calcium compounds include calcium carbonate, calcium phosphate, calcium borates, or mixtures thereof.

Phosphorus compounds include phosphoric acid and phosphonic acids, their alkali and alkaline earth metal salts, or mixtures thereof.

Antimony compounds include antimony oxide, antimony sulphate, etc. or mixtures thereof.

Titanium compounds include titanium dioxide and organofunctional titanates, such as titanium (IV) 2,2-bis(2 propenolatomethyl)butanolato tris (dioctyl) phosphato-O, titanium (IV) 2,2-bis (2 propenolatomethyl) butanolato tris (dioctyl) pyrophosphate-O, isopropyl triisostearoyl titanate, isopropyl (dioctyl pyrophosphate) titanate, isopropyl tri (N-aminoethyl aminoethyl) titanate and isopropyl tridecyl benzene sulfonyl titanate or mixtures thereof.

It is preferable to use modification agents in an amount ranging from 0.001 to 5.0 wt. % based on magnesium oxide.

The modification is carried out by any known method, for example, suspension or dry method.

The following analytical methods and instruments were used to analyse high-purity magnesium oxide:

- specific surface area using the BET method was determined by high-speed analyser of surface area and pore size "Quadrasorb" manufactured by Quantachrome Instruments, USA;
- the particle size distribution was determined by laser diffraction using a "Malvern MasterSizer-2000 E" device with a Scirocco 2000 module from Malvern Limited, UK;
- mass fraction of impurities Pb, Cd, As, Hg, Ba, Zn, Ti, Mn, Co, Mo, V, Sb, Sr, Al, P, Si, Cr, Ni, Fe, B, Ca, Li, Na, K was determined by inductively coupled plasma atomic emission spectrometry using an Optima 8000 device manufactured by PerkinElmer, USA;

- the mass fraction of F was determined by potentiometric titration;
- the mass fraction of chlorides $Cl^-$ and sulfates $SO_4^{2-}$ was determined by the phototurbidimetric method;
- pore volume, macropore volume, and modal pore diameter were determined by mercury porosimetry using a Pascal 140-440 mercury porosimeter manufactured by Thermo Scientific (USA);
- the volume of micropores and mesopores was determined by the nitrogen adsorption method using an ASAP 2020 analyser manufactured by Micrometrics Instrument Corporation (USA);
- the total pore volume was calculated as the sum of the pore volume (macro-, meso- and micro);
- the volume fraction of the volume of macro-, meso- and micropores was calculated as the ratio of the volume of macropores or the volume of micropores, or the volume of mesopores to the total pore volume, expressed as a volume percentage;
- the residue on the 325 mesh sieve was determined by the wet sieving method;
- citric acid activity (in seconds) was determined as the time of appearance of crimson colour after adding a 0.4 N solution of citric acid with phenolphthalein indicator to a suspension of magnesium oxide in water at a temperature of 30±2° C.;
- the dynamic viscosity of a suspension of magnesium oxide, prepared at the proportion of 125 g of magnesium oxide per 1 $dm^3$ of water, after stirring for 1 hour at a temperature of 23±2° C., was determined with a Brookfield viscometer;
- the rate of sedimentation of a suspension prepared at the proportion of 125 g of magnesium oxide per 1 $dm^3$ of water, after stirring for 1 hour, was determined in a 100 $cm^3$ cylinder after settling for 1 hour by determining the volume of the transparent layer above the suspension layer.

The proposed method for producing high-purity magnesium oxide is illustrated by the following examples.

Unit for the Production of Magnesium Oxide

The synthesis of magnesium hydroxide is carried out in a cascade consisting of three reactors. The working volume of each reactor is 120 $dm^3$. The stirring speed is 45 rpm.

Hydrothermal crystallization is carried out in an autoclave with a working volume of 1.6 $m^3$ and a stirring speed of 90 rpm.

Filtration of the magnesium hydroxide suspension is carried out using a pilot press filter from ANDRITZ (Germany).

Calcining of the wet magnesium hydroxide precipitate is carried out in a chamber furnace with three-sided heating from the Nabertherm N500 E (Germany).

Magnesium oxide is ground using a hammer mill from NETZSCH (Germany).

Example 1

A magnesium chloride solution is prepared by dissolving magnesium chloride hexahydrate in deionized water, then purified from iron and sulphates and passed through a column filled with Lanxess TP 208 MonoPlus ion exchange resin. In the purified solution, the mass fraction of magnesium chloride is 32.1%.

The sodium hydroxide solution obtained by electrolysis with a mercury cathode is diluted with deionized water to a mass fraction of sodium hydroxide of 16.6%.

The first reactor of the cascade is simultaneously fed with a purified solution of magnesium chloride at a flow rate of 33.5 kg/h and a suspension of seed crystals with a flow rate of 44 kg/h, sent after aging from the third reactor of the cascade.

The second reactor of the cascade is simultaneously fed with a solution of sodium hydroxide at a flow rate of 54.4 kg/h and a suspension of seed crystals treated with a solution of magnesium chloride from the first reactor. The resulting suspension of magnesium hydroxide crystals is continuously sent for aging to the third reactor of the cascade.

The temperature in all reactors of the cascade is maintained in the range of 50-60° C.

The residence time in the reactor cascade is 2 hours.

After aging, a suspension of magnesium hydroxide crystals is sent for hydrothermal crystallization at a temperature of 170° C. in the presence of 0.1 wt. % propylene glycol by weight of magnesium hydroxide for 3 hours.

The magnesium hydroxide suspension is filtered. Wet magnesium hydroxide crystals are washed on a filter with alkaline water with a mass fraction of sodium hydroxide of 0.02%. The magnesium hydroxide cake with a moisture content of 48% is calcined at a temperature of 950° C. for 2 hours and ground.

The characteristics of the obtained high-purity magnesium oxide are given in Tables 1-2.

Example 2

The bischofite solution, purified from sulphates and boron, is passed through a column filled with TP 208 MonoPlus ion exchange resin manufactured by Lanxess. In the purified solution, the mass fraction of magnesium chloride is 30.5%.

The sodium hydroxide solution obtained by diaphragm electrolysis is diluted with deionized water to a mass fraction of sodium hydroxide of 10.0%.

The first reactor of the cascade is simultaneously fed with a purified solution of magnesium chloride with a flow rate of 35.3 kg/h and a suspension of seed crystals with a flow rate of 12.6 kg/h, sent after aging from the third reactor of the cascade.

The second reactor of the cascade is simultaneously fed with a solution of sodium hydroxide at a flow rate of 90.8 kg/h and a suspension of seed crystals treated with a bischofite solution from the first reactor. The resulting suspension of magnesium hydroxide crystals is continuously sent for aging to the third reactor of the cascade.

The temperature in all reactors of the cascade is maintained in the range of 50-60° C.

The residence time in the reactor cascade is about 2 hours.

After aging, a suspension of magnesium hydroxide crystals is sent for hydrothermal crystallization at a temperature of 200° C. in the presence of 0.05 wt. % ethylene glycol by weight of magnesium hydroxide for 1 hour.

The magnesium hydroxide suspension is filtered. Wet magnesium hydroxide crystals are washed on a filter with alkaline water with a mass fraction of sodium hydroxide of 0.02%. The magnesium hydroxide cake with a moisture content of 38% is calcined at a temperature of 850° C. for 2 hours and ground in a hammer mill.

The characteristics of the obtained high-purity magnesium oxide are given in Tables 1-2.

Example 3

A magnesium chloride solution is prepared by dissolving magnesium chloride hexahydrate in deionized water, then purified from sulphates and passed through a column filled with AMBERLITE IRC 748 ion exchange resin manufactured by ROHM 15 and HAAS. In the purified solution, the mass fraction of magnesium chloride is 32.1%.

The sodium hydroxide solution obtained by membrane electrolysis is diluted with deionized water to a mass fraction of sodium hydroxide of 12.5%.

The first reactor of the cascade is simultaneously fed with a purified solution of magnesium chloride with a flow rate of 31.8 kg/h and a suspension of seed crystals with a flow rate of 33.3 kg/h, sent from the second reactor of the cascade.

The second reactor of the cascade is simultaneously fed with a solution of sodium hydroxide at a flow rate of 68.1 kg/h and a suspension of seed crystals treated with a bischofite solution from the first reactor. The resulting suspension of magnesium hydroxide crystals is continuously sent for aging to the third reactor of the cascade.

The temperature in all reactors of the cascade is maintained in the range of 70-80° C.

The residence time in the reactor cascade is 2 hours.

After aging, a suspension of magnesium hydroxide crystals is sent for hydrothermal crystallization at a temperature of 130° C. in the presence of 0.02 wt. % ethylene glycol by weight of magnesium hydroxide for 2 hours.

The magnesium hydroxide suspension is filtered. Wet magnesium hydroxide crystals are washed on a filter with alkaline water with a mass fraction of sodium hydroxide of 0.02%. The magnesium hydroxide cake with a moisture content of 48% is calcined at a temperature of 750° C. for 3 hours and ground in a hammer mill.

The characteristics of the obtained high-purity magnesium oxide are given in Tables 1-2.

Example 4

The bischofite solution is purified from bromine and passed through a column filled with AMBERLITE IRC 748 ion exchange resin manufactured by ROHM and HAAS. In the purified solution, the mass fraction of magnesium chloride is 28.0%.

The sodium hydroxide solution obtained by diaphragm electrolysis is diluted with deionized water to a mass fraction of sodium hydroxide of 13.5%.

The first reactor of the cascade is simultaneously fed with a purified solution of magnesium chloride with a flow rate of 63.6 kg/h and a suspension of seed crystals with a flow rate of 85.5 kg/h, sent from the second reactor of the cascade.

The second reactor of the cascade is simultaneously fed with a sodium hydroxide solution at a flow rate of 110.5 kg/h and a suspension of seed crystals treated with a bischofite solution from the first reactor. The resulting suspension of magnesium hydroxide crystals is continuously sent for aging to the third reactor of the cascade.

The temperature in all reactors of the cascade is maintained in the range of 50-60° C.

The residence time in the reactor cascade is 1 hour.

After aging, a suspension of magnesium hydroxide crystals is sent for hydrothermal crystallization at a temperature of 150° C. in the presence of 0.5 wt. % propylene glycol by weight of magnesium hydroxide for 4 hours.

The magnesium hydroxide suspension is filtered. Wet magnesium hydroxide crystals are washed on a filter with deionized water. The magnesium hydroxide cake with a moisture content of 39% is calcined at a temperature of 900° C. for 2 hours and ground in a hammer mill.

The characteristics of the obtained high-purity magnesium oxide are given in Tables 1-2.

Comparative Example 45 kg of magnesium chloride solution with a mass fraction of 32% is loaded into the reactor and 82 kg of lime milk with a mass fraction of calcium hydroxide of 15% is dosed with continuous stirring for 1 hour. Stirring is continued for 24 hours at a temperature of 20-30° C.

The magnesium hydroxide suspension is filtered, and the wet magnesium hydroxide crystals are washed on the filter with deionized water. The magnesium hydroxide cake with a moisture content of 65% is calcined in a muffle furnace at a temperature of 900° C. for 2 hours and ground in a hammer mill.

The characteristics of the obtained magnesium oxide are provided in Table 1.

TABLE 1

Magnesium oxide characteristics

| Characteristic name | Example 1 | Example 2 | Example 3 | Example 4 | Comparative example |
|---|---|---|---|---|---|
| Mass fraction of iron Fe, ppm | 11 | 34 | 20 | 50 | 300 |
| Mass fraction of chlorides Cl, % | 0.01 | 0.03 | 0.04 | 0.02 | 0.1 |
| Mass fraction of calcium Ca, % | 0.01 | 0.015 | 0.01 | 0.01 | 0.32 |
| Mass fraction of sodium Na, % | 30 | 100 | 300 | 80 | 10 |
| Mass fraction of boron B, % | 0.02 | 0.0005 | 0.02 | 0.02 | 0.02 |
| Mass fraction of sulphates $SO_4^{2-}$, % | 0.002 | 0.002 | 0.002 | 0.017 | 0.025 |
| Mass fraction of silicon Si, % | 0.006 | 0.009 | 0.007 | 0.009 | 0.12 |
| Specific surface area, $m^2/g$ | 20 | 35 | 62 | 15 | 30 |
| Citric acid activity, s | 70 | 65 | 45 | 65 | 54 |
| Pore volume, $m^3/g$ | $0.918 \times 10^{-6}$ | $1.392 \times 10^{-6}$ | $1.488 \times 10^{-6}$ | $1.275 \times 10^{-6}$ | $1.83 \times 10^{-6}$ |
| Volume fraction of macropore volume, % | 89 | 83 | 91 | 92 | 67 |
| Volume fraction of mesopore volume, % | 9.9 | 10.5 | 7.8 | 7.2 | 28.1 |
| Volume fraction of micropore volume, % | 1.1 | 1.5 | 1.2 | 0.77 | 4.9 |
| Modal pore diameter, nm | 280 | 200 | 340 | 285 | 135 |
| Particle size distribution, μm | | | | | |
| d10 | 0.8 | 0.7 | 0.6 | 0.9 | 3.4 |

TABLE 1-continued

| Magnesium oxide characteristics | | | | | |
|---|---|---|---|---|---|
| Characteristic name | Example 1 | Example 2 | Example 3 | Example 4 | Comparative example |
| d50 | 2.3 | 1.6 | 1.2 | 2.0 | 8.7 |
| d90 | 17.7 | 16.5 | 15.4 | 17.3 | 32.8 |
| Residue on a 325 mesh sieve, % | 0.02 | 0.01 | 0.02 | 0.03 | 1.5 |
| Aqueous suspension viscosity, cP | 135 | 180 | 200 | 140 | 370 |
| Whiteness, % | 98 | 100 | 99 | 99 | 67 |
| Suspension sedimentation rate, vol % per hour | 4 | 1 | 2 | 2 | 1 |

TABLE 2

| Impurities content in high purity magnesium oxide obtained according to Examples 1-5. | |
|---|---|
| Characteristic name | Mass fraction |
| Lead, Pb | Less than 0.1 ppm |
| Cadmium, Cd | Less than 0.1 ppm |
| Arsenic, As | Less than 0.1 ppm |
| Mercury, Hg | Less than 0.1 ppm |
| Barium, Ba | Less than 1 ppm |
| Zinc, Zn | Less than 1 ppm |
| Titanium, Ti | Less than 1 ppm |
| Manganese, Mn | Less than 1 ppm |
| Cobalt, Co | Less than 1 ppm |
| Molybdenum, Mo | Less than 1 ppm |
| Vanadium, V | Less than 1 ppm |
| Antimony, Sb | Less than 1 ppm |
| Strontium, Sr | Less than 1 ppm |
| Aluminium, Al | Less than 5 ppm |
| Fluorine, F | Less than 5 ppm |
| Phosphorus, P | Less than 10 ppm |
| Lithium, Li | Less than 10 ppm |
| Potassium, K | Less than 10 ppm |
| Chromium, Cr | Less than 10 ppm |
| Nickel, Ni | Less than 10 ppm |

Modification Example 1

100 g of high-purity magnesium oxide obtained according to Example 1 and 0.5 g of vinyltrimethoxysilane are loaded into a Henschel-type mixer and stirred for 10-15 minutes at a temperature of not more than 70° C. Modified magnesium oxide is obtained.

Modification Example 2

100 g of high-purity magnesium oxide obtained according to Example 1 and 2.0 g of calcium stearate are loaded into a Henschel-type mixer and mixed for 10-15 minutes at a temperature of not more than 100° C. Modified magnesium oxide is obtained.

Modification Example 3

100 g of high-purity magnesium oxide obtained according to Example 1 and 0.5 g of boric acid are loaded into a Henschel-type mixer and stirred for 10-15 minutes at a temperature of not more than 80° C. Modified magnesium oxide is obtained.

The given examples illustrate the essence of the presented invention and do not limit the scope of the claimed invention.

The above examples show that the proposed production method allows obtaining high-purity magnesium oxide with a low content of impurities, controlled activity, pore volume and pore size distribution, and particle size distribution.

The invention claimed is:

1. High-purity magnesium oxide, having a specific surface area, determined by the BET method, in the range from 5 to 70 $m^2/g$, an average particle size (d50), determined by laser diffraction, of not more than 5 μm, wherein the high-purity magnesium oxide has a mass fraction of impurity elements of each of Pb, Cd, As, Hg of not more than 0.1 ppm, a mass fraction of impurity elements of each of Ba, Zn, Ti, Mn, Co, Mo, V, Sb, Sr of not more than 1 ppm, a mass fraction of impurity elements of each of Al, F of not more than 5 ppm, a mass fraction of impurity elements of each of P, Cr, Ni, K, Li of not more than 10 ppm, a mass fraction of Fe of not more than 50 ppm, a mass fraction of Si of not more than 0.01%, a mass fraction of impurity elements of each of Ca, B of not more than 0.02%, a mass fraction of sulphates $SO_4^{2-}$ of not more than 0.02%, a mass fraction of Na impurity of not more than 0.05%, a mass fraction of chloride impurity of not more than 0.05%, and wherein the high-purity magnesium oxide includes primary particles and agglomerates consisting of primary particles; and characterized in that the high-purity magnesium oxide has a pore volume determined by mercury porosimetry in the range from $0.9\times10^{-6}$ to $1.5\times10^{-6}$ $m^3/g$.

2. High-purity magnesium oxide of claim 1, characterized in that it has a mass fraction of chlorides of not more than 0.025%.

3. High-purity magnesium oxide of claim 1, characterized in that it has a mass fraction of iron of not more than 20 ppm.

4. High-purity magnesium oxide of claim 1, characterized in that it has a specific surface area, determined by the BET method, in the range from 10 to 30 $m^2/g$.

5. High-purity magnesium oxide of claim 1, characterized in that it has a macropore volume in the range of 85-93 vol %, a mesopore volume in the range of 6.5-14 vol %, a micropore volume in the range of 0.5-1.5 vol % based on the total pore volume.

6. High-purity magnesium oxide of claim 1, characterized in that it has a modal pore diameter, determined by mercury porosimetry, in the range from 150 to 400 nm.

7. High-purity magnesium oxide of claim 1, characterized in that it has an average particle size (d50), determined by laser diffraction, of not more than 3.5 μm.

8. High-purity magnesium oxide of claim 1, characterized in that 10% of the particles have a diameter of not more than 2 μm, and 90% of the particles have a diameter of not more than 30 μm, determined by laser diffraction.

9. High-purity magnesium oxide of claim 1, characterized in that it has a residue on a 325 mesh sieve of not more than 0.1%.

10. High-purity magnesium oxide of claim 1, characterized in that it has a citric acid activity in the range from 40 to 200 s.

11. High-purity magnesium oxide of claim 1, characterized in that when the high-purity magnesium is mixed with water to form a suspension, the suspension has a dynamic viscosity of not more than 400 cP, when prepared at the proportion of 125 g of magnesium oxide per 1 $dm^3$ of water, after stirring for 1 hour at a temperate of 23±2° C., and is determined with a Brookfield viscometer.

12. High-purity magnesium oxide of claim 1, characterized in that it is modified by one or several surface-treating agents selected from the group of:

saturated and unsaturated fatty acids containing from 8 to 20 carbon atoms, alkaline salts of saturated and unsaturated fatty acids containing 8 to 20 carbon atoms, alkaline earth metal salts of saturated and unsaturated fatty acids containing 8 to 20 carbon atoms, and silane coupling agents selected from the group of organofunctional trialkoxysilanes, tetraalkoxysilanes, and mixtures thereof;

in an amount from 0.001 to 5.0% by weight of magnesium oxide.

13. The high-purity magnesium oxide of claim 1, characterized in that it is modified by one or several additives selected from:

a) alkali and alkaline earth salts of silicic acids, silicon dioxide or mixtures thereof;

b) boric acid, alkali metal salts of boric acid, alkaline earth metal salts of boric acid, and mixtures thereof;

c) calcium carbonate, calcium phosphate, calcium borates and mixtures thereof;

d) antimony oxide, antimony sulphate, and mixtures thereof;

e) phosphoric acid, phosphonic acid, alkali metal salts of phosphoric acid, alkaline earth metal salts of phosphoric acid, alkali metal salts of phosphonic acid, and alkaline earth metal salts of phosphonic acid, and mixtures thereof; and f) titanium dioxide, organofunctional titanates, and mixtures thereof;

and mixtures thereof in an amount from 0.001 to 5.0% by weight of magnesium oxide.

* * * * *